US007809714B1

(12) United States Patent
Smith

(10) Patent No.: US 7,809,714 B1
(45) Date of Patent: Oct. 5, 2010

(54) PROCESS FOR ENHANCING QUERIES FOR INFORMATION RETRIEVAL

(76) Inventor: Lawrence Richard Smith, 46 Middle Rd., Boxborough, MA (US) 01719

( * ) Notice: Subject to any disclaimer, the term of this patent is extended or adjusted under 35 U.S.C. 154(b) by 349 days.

(21) Appl. No.: 11/951,404

(22) Filed: Dec. 6, 2007

Related U.S. Application Data

(60) Provisional application No. 60/975,321, filed on Sep. 26, 2007, provisional application No. 60/914,876, filed on Apr. 30, 2007, provisional application No. 60/941,038, filed on May 31, 2007.

(51) Int. Cl.
*G06F 17/30* (2006.01)
(52) U.S. Cl. .................. 707/713; 707/705; 707/752; 707/754; 707/779; 707/E17.017; 707/999.002; 707/999.005
(58) Field of Classification Search .................. None
See application file for complete search history.

(56) References Cited

U.S. PATENT DOCUMENTS

| | | | |
|---|---|---|---|
| 5,263,159 A | 11/1993 | Mitsui | |
| 5,278,980 A | 1/1994 | Pedersen et al. | |
| 5,640,553 A | 6/1997 | Schultz | |
| 5,675,819 A | 10/1997 | Schuetze | |
| 5,692,176 A | 11/1997 | Holt et al. | |
| 5,721,897 A | 2/1998 | Rubinstein | |
| 5,737,734 A | 4/1998 | Schultz | |
| 5,991,713 A | 11/1999 | Unger et al. | |
| 6,006,225 A * | 12/1999 | Bowman et al. | 707/5 |
| 6,061,675 A | 5/2000 | Wical | |
| 6,169,986 B1 * | 1/2001 | Bowman et al. | 707/5 |
| 6,401,084 B1 * | 6/2002 | Ortega et al. | 707/2 |
| 6,415,282 B1 | 7/2002 | Mukherjea et al. | |
| 6,460,029 B1 | 10/2002 | Fries et al. | |
| 6,507,841 B2 | 1/2003 | Rivierieulx de Varax | |
| 6,564,213 B1 * | 5/2003 | Ortega et al. | 707/5 |
| 6,636,848 B1 | 10/2003 | Aridor et al. | |
| 6,675,159 B1 | 1/2004 | Lin et al. | |
| 6,701,309 B1 | 3/2004 | Beeferman et al. | |
| 6,714,929 B1 | 3/2004 | Micaelian et al. | |

(Continued)

OTHER PUBLICATIONS

Saurabh Pathak and Donna Bergmark, metacombine_focusedCrawl_module1.0, website, Jun. 1, 2005, USA, (www.metacombine.org).

(Continued)

*Primary Examiner*—Don Wong
*Assistant Examiner*—Andalib F Lodhi
(74) *Attorney, Agent, or Firm*—O'Connell Law Firm

(57) ABSTRACT

Enhancing queries for information retrieval that automatically finds the preferred, first ranked matching term usage subject area ("TUSA") from a prior query. The process automatically finds alternative TUSAs for the prior query, ranked by degree of match or preference, and provides an option to switch among the alternative TUSAs. It is required that a TUSA for the query be passively accepted or actively selected from a presented list based on the prior query. Using means prepared in advance from data sets of messages collected for each TUSA and general vocabulary the process also ranks and presents to the user alternative and additional query terms and phrases reflecting specificity and relevance to the query and the TUSA. Significantly relevant terms and phrases are presented for query refinement and ranked by relevance permitting the user to select and deselect query terms and effect a new search based on the enhanced query.

26 Claims, 6 Drawing Sheets

U.S. PATENT DOCUMENTS

| | | |
|---|---|---|
| 6,741,981 B2 | 5/2004 | McGreevy |
| 6,751,614 B1 | 6/2004 | Rao |
| 6,778,979 B2 | 8/2004 | Grefenstette et al. |
| 6,907,423 B2 | 6/2005 | Weil et al. |
| 6,925,433 B2 | 8/2005 | Stensmo |
| 6,941,297 B2 | 9/2005 | Carmel et al. |
| 6,947,930 B2 | 9/2005 | Anick et al. |
| 6,963,867 B2 | 11/2005 | Ford et al. |
| 7,003,513 B2 | 2/2006 | Geiselhart |
| 7,085,771 B2 | 8/2006 | Chung et al. |
| 7,136,845 B2 | 11/2006 | Chandrasekar et al. |
| 7,139,755 B2 | 11/2006 | Hammond |
| 7,149,732 B2 | 12/2006 | Wen et al. |
| 7,162,471 B1 | 1/2007 | Knight et al. |
| 7,171,351 B2 | 1/2007 | Zhou |
| 2002/0099700 A1 | 7/2002 | Li |
| 2002/0138478 A1 | 9/2002 | Schwartz et al. |
| 2002/0188587 A1 | 12/2002 | McGreevy |
| 2002/0188599 A1 | 12/2002 | McGreevy |
| 2003/0004914 A1 | 1/2003 | McGreevy |
| 2003/0014399 A1 | 1/2003 | Hansen et al. |
| 2003/0014501 A1 | 1/2003 | Golding et al. |
| 2003/0069877 A1 | 4/2003 | Grefenstette et al. |
| 2003/0078913 A1 | 4/2003 | McGreevy |
| 2003/0115191 A1 | 6/2003 | Copperman et al. |
| 2003/0149704 A1 | 8/2003 | Yayoi et al. |
| 2003/0195877 A1 | 10/2003 | Ford et al. |
| 2004/0044952 A1 | 3/2004 | Jiang et al. |
| 2005/0055321 A1 | 3/2005 | Fratkina et al. |
| 2005/0080780 A1 | 4/2005 | Colledge et al. |
| 2005/0091197 A1 | 4/2005 | Dettinger et al. |
| 2005/0097188 A1 | 5/2005 | Fish |
| 2005/0102251 A1 | 5/2005 | Gillespie |
| 2005/0125429 A1 | 6/2005 | Corston-Oliver et al. |
| 2005/0289140 A1 | 12/2005 | Ford et al. |
| 2006/0031195 A1 | 2/2006 | Patterson |
| 2006/0106792 A1 | 5/2006 | Patterson |
| 2006/0122979 A1 | 6/2006 | Kapur et al. |
| 2006/0122991 A1 | 6/2006 | Chandrasekar et al. |
| 2006/0136451 A1 | 6/2006 | Denissov |
| 2006/0167842 A1 | 7/2006 | Watson |
| 2006/0224579 A1 | 10/2006 | Zheng |
| 2006/0271520 A1 | 11/2006 | Ragan |
| 2007/0033221 A1 | 2/2007 | Copperman et al. |
| 2007/0038602 A1 | 2/2007 | Weyand et al. |
| 2007/0038621 A1 | 2/2007 | Weyand et al. |
| 2007/0050351 A1 | 3/2007 | Kasperski et al. |
| 2007/0067275 A1 | 3/2007 | Shekel |
| 2007/0073748 A1 | 3/2007 | Barney |
| 2007/0078814 A1 | 4/2007 | Flowers et al. |
| 2007/0078822 A1 | 4/2007 | Cucerzan et al. |
| 2007/0100804 A1 | 5/2007 | Cava |
| 2007/0100915 A1 | 5/2007 | Rose et al. |
| 2007/0150450 A1 | 6/2007 | Murase |
| 2007/0162379 A1* | 7/2007 | Skinner ................. 705/37 |

OTHER PUBLICATIONS

Erik Kristoffersen, "Semi-automatic web resource discovery using ontology-focused crawling", Master's Thesis, USA 2005.

Olena Medelyan, et al., "Language Specific and Topic Focused Web Crawling", USA.

Ted Dunning, Accurate Methods for the statistics of surprise and coincidence, 1993, USA.

Manning and Schutze, Foundations of Statistical Natural Language Processing p. 175, 1999, USA.

Fred Damerau, Generating and evaluating domain-oriented multiword terms from texts, 1993, USA.

Bannerjee and Pedersen, The Design, Implementation, and Use of the NGram Statistics Package, Fourth International Conference on Intelligent Text Processing, 2003.

\* cited by examiner

PROCESS FOR ENHANCING QUERIES FOR INFORMATION RETRIEVAL

CROSS REFERENCE TO RELATED APPLICATIONS

This application claims priority from U.S. Provisional Patent Application Ser. No. 60/975,321, entitled "A Process for Enhancing Queries for Information Retrieval", filed on 26 Sep. 2007.

This application claims priority from U.S. Provisional Patent Application Ser. No. 60/914,876, entitled "A Process for Enhancing Queries for Information Retrieval", filed on 30 Apr. 2007.

This application claims priority from U.S. Provisional Patent Application Ser. No. 60/941,038, entitled "A Process for Enhancing Queries for Information Retrieval", filed on 31 May, 2007.

FEDERALLY SPONSORED RESEARCH

Not Applicable

SEQUENCE LISTING OR PROGRAM

Not Applicable

TECHNICAL FIELD OF THE INVENTION

The present invention relates generally to the field of information retrieval. More specifically, the present invention relates to a process for enhancing queries for information retrieval.

BACKGROUND OF THE INVENTION

Many Internet sites and computer systems provide search engines to help users find documents and other items of interest. Google and Yahoo are examples, as are Lexis and Westlaw. Many business entities commonly provide search engines for assisting customers and employees in locating items of interest In general, to use a search engine, a user creates and submits a query containing one or more search terms. The search engine processes the query and returns a list of items of interest and/or descriptions of and pointers to items of interest. An information retrieval system seeks to match the terms contained in a user query, which is a request for information, to individual documents or information modules known to the system.

Information retrieval based on indexing of the documents in a document collection is also known in the prior art. Typically an index is created to record documents that correspond to specific words or terms of potential queries. When a user creates a query, the documents that contain or otherwise correspond to some or all of the terms of the query are identified.

Information retrieval is an imperfect art. A query often produces unsatisfactory retrieval results by either returning insufficient documents that are relevant, returning documents that are not relevant, or some undesired combination of both. A standard means to assess information retrieval effectiveness is to measure "recall" and "precision", corresponding respectively to the proportion of desired documents returned and the proportion of returned documents that are correct.

A user faces a number of problems in formulating a query to effectively retrieve the desired documents. First, the user often may not know a subject area well enough to know specifically what s/he is looking for. Secondly, the user may only have general concepts in mind with no means to map these effectively to terms that may actually occur in the documents of interest. Third, even if the user has some specific terms in mind, they may not be sufficiently effective for query construction since the user often does not know the terms, phraseology, and usage patterns that are current in the subject area of interest. Fourth, the user will not likely be aware which terms that may seem to be associated with the desired information goal are actually of more general use in documents that should be excluded. Finally, the user can not normally know the various ways in which the information retrieval system may weight, bias, favor, or exclude terms during and for reasons of internal processing or selection of returned documents.

To improve recall and/or precision the user often needs to modify the original query. However, the process of revision has the same limitations as the formulation of the original query, including that the user needs to estimate, with no reliable basis, which terms might correspond with sufficient strength or frequency, and relative to a 'black box' information retrieval system, to all and only the documents s/he desires to retrieve.

The prior art teaches several strategies to help the user construct queries. Some systems enhance the query by handling grammatical or other variants of words so the user need not bother with plurality, tense or other variations of no relevance to the query. Other systems may expand the query to include entries from a thesaurus of synonyms for terms in the original query. Additionally, systems may examine the documents returned from the original query in order to discover terms that can be used to refine the query, either by the user, or automatically. Finally, systems may attempt to narrow the scope of the query to one or more restricted narrow topic areas so that only items corresponding to the topic narrowing may be displayed.

A number of prior systems attempt to facilitate information retrieval by determining a set of topics that may correspond to the user query. These systems provide, along with the search results, clickable links, which, if selected, lead to pages containing only items within the topic selected. The topics in these systems are not used to help the user construct queries. The use of topics is optional and the user is not directed into a refined search within a particular topic area. The topics are not associated with vocabularies of terms for use in query. These systems have not collected and appropriately analyzed a set of documents for a set of subject areas in order to make term usage and phraseology per subject area available to the user. They do not mandate restriction to a subject area as part of the query process.

Other prior systems process the vocabulary of the documents retrieved for a query to determine associations of retrieved document terms with query terms. This enables such systems to offer the user a very limited selection of terms for the user to consider adding to the query.

One shortcoming is that these systems have not collected and appropriately analyzed a set of documents for a set of subject areas in order to make term usage and phraseology per subject area available to the user. Therefore what is needed is a system that collects and appropriately analyzes a set of documents for a set of subject areas to generate term usage and phraseology per subject that is available to the user.

Another shortcoming of these systems is that they do not mandate restriction to a subject area as part of the query process. Consequently, they cannot offer the same systematic broad coverage of terms and phrases for potential enhancement of the query. Therefore what is needed is a system that mandates restriction to a subject area as part of the query process that results in a systematic broad coverage of terms and phrases for potential query enhancement.

In addition, these prior systems may offer advertisements or other ancillary material to the user and in so doing analyze either the query the user has submitted or the content of the text of the page of material the user has navigated to. This analysis enables the information system to present advertisements or ancillary materials that are relevant to the query or the content of the page. Since advertisers pay for display of their advertisements this facility is part and parcel of the commercial business model for the information system. Pricing for advertisement placement in these systems may depend on or be constrained by the degree of said relevancy.

Therefore there is a need for an improved process for enhancing queries for information retrieval with respect to accuracy and relevancy with respect to the returned results.

There is also a need for an improved process for enhancing queries for information retrieval that collects and appropriately analyzes a set of corpuses of documents in order to make term usage and phraseology available to the user.

What is also needed is an improved process for enhancing queries for information retrieval that automatically identify primary and alternate terms for a user query and ranks them by relevance to the user's query so that the user may consider selection from a range of relevant alternative terms.

What is also needed is an improved process for enhancing queries for information retrieval that forces the user passively or actively to accept a default or choose from a list a term usage subject area appropriate to the query, to enable relevant additional query term lists confined within its scope to be subsequently used.

What is also needed is an improved process for enhancing queries for information retrieval to automatically resource the discussions and expositions of a community of interlocutors and experts for the purpose of presenting the user with its standard terminology and phraseology.

What is also needed is an improved process for enhancing queries for information retrieval that allows the user to construct and learn to construct more effective queries by presenting lists of terms that demonstrate the implications or connotations of particular search terms in the user's original query.

What is also needed is an improved process for enhancing queries for information retrieval that makes unnecessary the knowledge of a specialized query language by presenting concrete terms to be added to the query.

What is also needed is an improved process for enhancing queries for information retrieval that offers concrete terminology options to the user, more effective than artificial abstractions away from the users own words and interests such as artificial tags or computer-oriented tags.

SUMMARY OF THE INVENTION

The present invention automatically identifies primary and alternate term subject usage areas (also referred to as "TUSAs") corresponding to a user query and ranks them by relevance to the user query. TUSAs are topics or subject areas for which term usage statistics have or can be collected, henceforth "TUSA", as characterized below.

The present invention forces the user passively or actively to accept or specify the TUSA of the search thus enabling relevant lists of additional query terms to be constructed. By utilizing the TUSA in conjunction with generation of additive query terms, the present invention enables more focused and higher quality information to be accessed with less user effort.

The present invention resources a community of interlocutors, discussants, and experts through a collection of their messages; and presents the user with standard phraseology that can be relevantly and usefully combined with terms of a user's original query. The present invention then suggests alternate wording for query terms and alternate phrasing for queries; these alternatives are based on patterns of terms in collections of expressions defined by a TUSA. It thereby helps a user refine information retrieval queries by suggesting additional query terms relevant to the context of a TUSA.

The present invention helps a user learn to construct better queries by demonstrating the implications or connotations of particular search terms in the user's original query and saves typing query words since the user can click on desired terms, which are presented in lists.

The present invention provides users with useful query terms relevant to the user's original query that are easy to recognize but do not come readily to mind. The user is presented with additional query terms relevant to the user's original query reflecting his/her own mental and cultural categories embodied in words of natural language.

The present invention presents for use in queries phraseology and usage relevant to the user's original query that is standard among experts and those conversant in the TUSA. The present invention thus facilitates exploration and investigation of a TUSA by partial automation, allowing the user without typing to quickly select query terms and try them to observe the results and provides terms either to widen or narrow the user's original query. A user is able to select individual words as terms for recall of a wider range of documents, or phrases for more precise targeting.

The present invention obviates in many circumstances knowledge of a specialized query language. It allows browsing of subjects in terms of the user's own interests and known meaning systems. Concrete options are offered and are more effective than artificial abstractions away from the users own words and interests such as artificial tags or computer-oriented tags. It offers a means for a user of an information retrieval system to find survey, tutorial, summary and other general material related to the query easily by a simple automatic or prompted enhancement to the user's original query.

The present invention provides a novel and powerful mechanism for decisions in an information system about where and how often advertisements and ancillary materials should be displayed in order that the relevancy of the advertisements and ancillary materials remain relevant to the context in which they are presented. It also provides a means to better make decisions about pricing for the display of material that advertisers may wish to have distributed.

An objective of the invention is to automatically identify primary and alternate TUSAs for a user query and rank them by relevance to the user query so that the user may consider selection from a range of relevant alternative TUSAs.

Another objective of the invention is to force the user passively or actively to accept a default or choose from a list a TUSA appropriate to the query, to enable relevant additional query term lists confined within its scope to be subsequently used.

A further objective of the invention is to enable access to more focused and higher quality information with less user effort by mandating the TUSA as an available advantage to the information retrieval engine so that it can return more accurate results.

Yet another objective of the invention is to automatically resource the discussions and expositions of a community of interlocutors and experts for the purpose of presenting the user with its standard terminology and phraseology.

Still yet another objective of the invention is automatically to suggest terms and phrasing for use in the construction of a query to help users refine information retrieval queries by suggesting additional query terms relevant both to the user's original query and to the context of a TUSA.

Another objective of the invention is to help the user construct and learn to construct more effective queries by presenting lists of terms that demonstrate the implications or connotations of particular search terms in the user's original query.

A further objective of the invention is to save the user typing query terms insofar as the user can click on desired terms presented in lists and provide users with useful query terms that are easy to recognize but do not come readily to mind.

Still yet another objective of the invention is to present the user with additional query terms relevant to the user's original query reflecting his/her own mental and cultural categories embodied in words of natural language.

Another objective of the invention is to present for use in queries phraseology and usage relevant to the user's original query that is standard among experts and those conversant in the TUSA.

Another objective of the invention is to facilitate exploration and investigation of a TUSA by supportive automation, allowing the user, without typing, quickly to select query terms and try them to observe the results to provide terms either to widen or narrow the user's original query.

Yet another objective of the invention is to enable users to select individual words as terms for recall of a wider range of documents, or phrases for more precise targeting and to obviate for many circumstances knowledge of a specialized query language by presenting concrete terms to be added to the query.

Another objective of the invention is to allow exploratory browsing of subjects in terms of the user's own interests and known meaning systems and to offer concrete terminology options to the user, more effective than artificial abstractions away from the users own words and interests such as artificial tags or computer-oriented tags.

Another objective of the invention is to enable users easily to access general, summary, survey and tutorial information related to an initial query.

A further objective of the invention is to provide a novel and powerful mechanism for decisions in an information system about where and how often advertisements and ancillary materials should be displayed in order that the relevancy of the advertisements and ancillary materials remain relevant to the context in which they are presented. Means are also provided to better make decisions about pricing for the display of material that advertisers may wish to have distributed.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Figure 1:
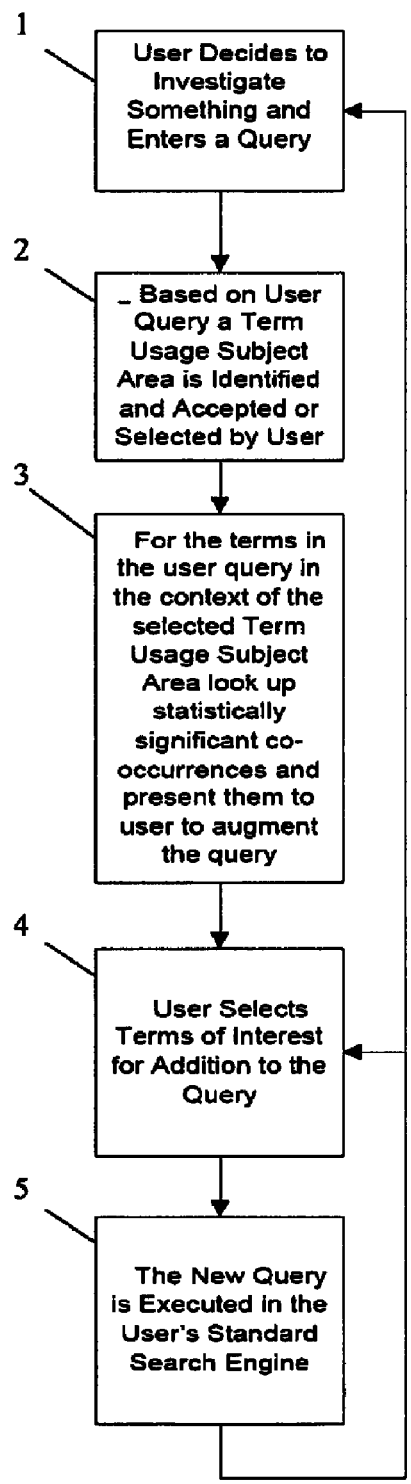
FIG. 1 is a flow chart showing a high level view of the present invention, a process for enhancing queries for information retrieval.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention.

Referring to the figures, it is possible to see the various major elements constituting the apparatus of the present invention. The present invention is a process for enhancing queries for information retrieval.

The primary object of the invention is to automate selection of a TUSA for an input user query, and, by virtue of and subsequent to this first step, automatically to list significant and useful terms for consideration by the user during the process of query construction or revision. TUSAs are topics or subject areas for which term usage statistics have or can be collected.

A TUSA relates to a topic or subject area in multiple respects. A TUSA may frequently but not exclusively be wider or equivalent to the intended scope of the query relative to more narrowly specific individual topics, and thereby subsume a range of individual topics. A TUSA may correspond to a sufficient area of coverage such that a community of users with or without a forum might have repeated discussion of it, thereby enabling the extraction of usage patterns from their linguistic expressions. A TUSA may define a forum of discourse, discussion, and/or exposition such that the expressions of participants are available and may be collected in advance for the purpose of creating mappings via tables or calculations that, for the terms in a query, render other terms which meaningfully may co-occur with them. A TUSA may be reflected in a variety of kinds of messages or documents, oral or written, recorded or transient, including but not exclusive to USENET newsgroups, academic articles, on-line forums, web pages, public meetings, electronic or in-person conferences, and diverse communications of other kinds. A TUSA may be a source of term usage information for any recognized subject area. Finally, a TUSA may reflect a pattern of communications in any form among a group of people sharing an interest.

In accordance with a preferred embodiment of the invention, there is disclosed a process for enhancing queries for information retrieval comprising the steps of:

A. prior preparation during system development of the means, for each TUSA, to suggest, in lists of single terms and multiple term phrases, ranked by relevance to a query, alternative and additive terms corresponding to query terms selected by the user, effected by compiling and analyzing a collection of documents for the TUSA;

B. automatically or semi-automatically finding the preferred or first ranked matching TUSA from the prior query, whether it be a manually entered user query or a query created manually or automatically in some other process;

C. automatically or semi-automatically finding alternative TUSAs for the prior query, ranked by degree of match or preference for the query, and provide an option to switch among the alternative TUSAs;

D. requiring that a TUSA for the query be passively accepted or actively selected from a presented list;

E. selecting and presenting for the user alternative and additional query terms based on the prior query and selected TUSA using means prepared in advance from data sets of messages collected for each TUSA and general vocabulary;

F. ranking the alternative and additional query terms by a metric reflecting specificity and relevance to the query and the TUSA;

G. selecting and presenting statistically significant phrases, specific for the query and TUSA, for the purpose of query refinement, ranked by specificity and relevance to the query and TUSA;

H. permitting the user to deselect or select query terms by a mechanism such as mouse click, or other simplified executive action that does not require typing individual characters;

I. providing an automatic mechanism to combine the query terms selected by the user with the original prior query terms to create a new, enhanced query;

J. providing means to submit the new enhanced query to the search engine and to generate and view the results;

K. providing means for selection and pricing of advertising and ancillary materials;

L. providing means for selection of web pages for display of advertisements and ancillaries; and M. providing means for finding general, survey, tutorial, and summary material automatically.

FIG. 1 illustrates a high level view of the use of the present invention by a user. In a first step a user decides to investigate something and enters a query 1. Based on a prior query a TUSA is identified and confirmed by user 2. For the terms in the user query, the context of the selected TUSA looks up statistically significant co-occurrences and presents them to user to augment the query 3. Next, a user selects terms of interest for addition to the query 4. Finally, a new query is executed in the user's standard search engine 5.

Figure 2:
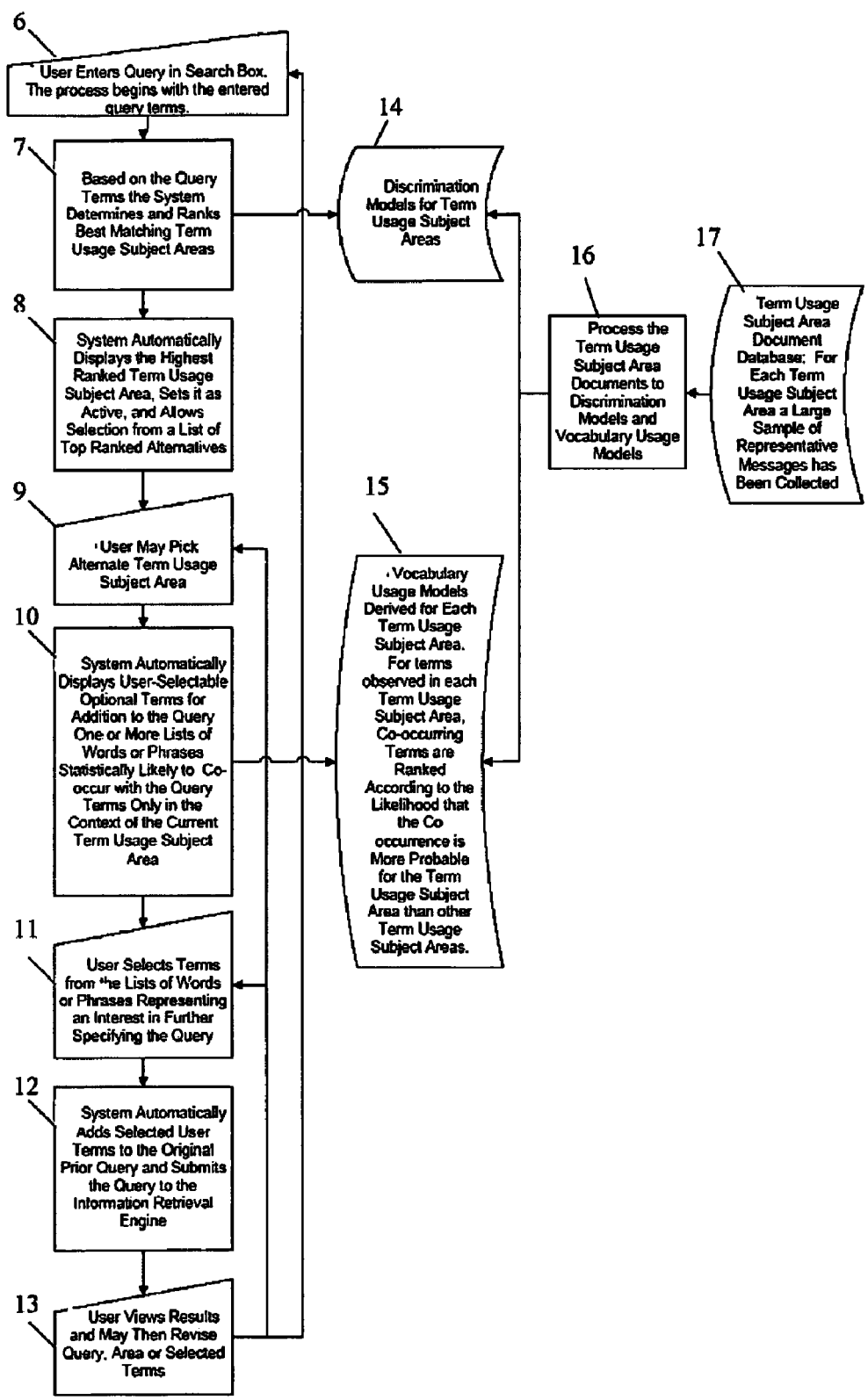
FIG. 2 is a flow chart diagram illustrating the process of query refinement of the present invention conjoined with the process of compiling the information needed to enable the process of query refinement showing an information search and retrieval system that incorporates the query enhancement process of the present invention.

FIG. 2 is a flow chart diagram illustrating the process of query refinement of the present invention conjoined with the process of compiling the information needed to enable the process of query refinement. It shows an information search and retrieval system that incorporates the query enhancement process of the present invention.

The present invention operates in support of an information search and retrieval system which is separate, but to which it is integrated. The information search and retrieval system receives a user input query 6 comprised of one or more query terms, and produces as output, an information response that includes a list of documents or other useful information items 13.

The query enhancement process of the present invention receives from the information search and retrieval system, or otherwise, the user input query 6 comprised of one or more query terms, and produces as output a list, ranked by appropriateness to the query 7, of TUSAs. It also selects an automatic default selection of the highest ranked TUSA 8, and, for the TUSA selected, listings of additional query terms 10 which are relevant both to the prior query and the active TUSA. The user may override 9, the automatically selected TUSA, with a preference of choice lower in the ranked list, in response to which the listings of additional query terms are automatically updated to reflect the newly chosen TUSA.

The query enhancement process of the present invention depends on a previously collected corpus of documents for each TUSA that the system supports. The corpus of documents for each TUSA is a plurality of documents that cover that TUSA. The content of the documents may include articles, web pages, forum discussions, books, periodicals, and messages of any other kind in any form. At the time of use of the present invention the corpuses of documents for the list of covered TUSAs have been analyzed to produce a vocabulary usage model for each TUSA. These models incorporate look up capability such that for any set of terms in a prior query additional terms useful for query enhancement can be retrieved for the user. The corpuses of documents have also been analyzed to produce TUSA discrimination models that enable the system to select a ranked list of TUSAs for a given prior query.

Still referring to FIG. 2, the steps and components operate as follows. First a user enters a query in search box 6 as the process begins with the entered query terms. Next, based on the query terms the system determines and ranks the best matching term usage subject areas ("TUSAs") 7.

A term usage subject area ("TUSA") is characterized topics or subject areas for which term usage statistics have or can be collected. A TUSA relates to a topic or subject area in multiple respects. It frequently but not exclusively can be wider or equivalent to the intended scope of the query relative to narrowly specific individual topics and thereby subsume a range of individual topics. TUSAs also correspond to a sufficient area of coverage such that a community of users with or without a forum might have repeated discussion of it, thereby enabling the extraction of usage patterns. TUSAs may define a forum of discourse, discussion, and/or exposition such that the expressions of participants are available and may be collected in advance for the purpose of creating mappings via tables or calculations which, for the terms in a query, render other terms which meaningfully may co-occur with them. A TUSA may be reflected in a variety of kinds of messages or documents, oral or written, recorded or transient, including but not exclusive to USENET newsgroups, academic articles, on-line forums, web pages, public meetings, electronic or in-person conferences, and diverse communications of other kinds or is a source of term usage for any recognized subject area. Finally, a TUSA reflects a pattern of communications in any form among a group of people sharing an interest.

A TUSA is a broad delineation of content that defines a set of documents, messages, expositions, and other communications of diverse kinds covering perhaps a multiplicity of related topics. An example is 'hearing loss', which covers a multiplicity of subsumed (sub-)topics and delineates a set of documents, messages, expositions, and other communications of shared topical interest. Insofar as some topics may be broader than others and may contain a number of sub-topics an instance of a topic may operationally be considered for the purposes of this invention either a topic within a TUSA, if sufficiently subordinate in a particular use context, or, if there is reason to promote it to afford greater resolution, it may be treated as a TUSA in its own right. Therefore the distinction is operational, depending on how much detail is useful for a particular purpose and how much data is available for the purpose of analyzing usage patterns. The essence of a TUSA is that it effectively determines the scope of a prior query relative to individual topics such that a collection of messages exemplifying usage patterns may be resourced.

In preparation of other steps it is necessary for a human editor to determine a list of term subject areas to be covered. The list can be manually constructed to reflect the subject areas that it is desired to cover. One useful method is to browse in a Directory such as The Open Directory (www.dmoz.org), to examine the documents available in the taxonomy of categories offered, and select a list of term subject areas to be covered.

In the present invention, a set of documents is required for each TUSA. This set can be constructed in a variety of methods. In a first method, an editor uses a publicly available directory such as The Open Directory (www.dmoz.org) to manually identify and download documents within the TUSA. In a second method, an editor consults the Internet News Groups (www.google.com/groups) or other discussion forum to find a discussion forum centered on the desired content then downloads a desired sampling of messages from this forum. In a third method, a set of messages is collected automatically by means of a software program known by those practiced in the art as a focused crawler. Such a method is described below in the section disclosing how Discrimination Models for TUSAs, which also require a collection of documents, can be constructed. The documents collected for one purpose, such as Discrimination Models for TUSAs, can in some embodiments also be used for deriving term co-occurrence relations as described later. There are many methods known in the art that can be used to generate a set of messages falling within the subject area of a TUSA. For some methods envisaged below, it may be necessary to ensure that the amount of text collected for each term subject area, counted in words, is roughly equal to that collected for each other term subject area.

TUSAs are assigned in the present invention using Discrimination Models for TUSAs 14. A simple form of discrimination model 14 is constructed as follows. If for a given application it is desired to cover N TUSAs the builder of the application first identifies the TUSAs by consulting resources such as the Dewey Decimal System or the Open Directory Project to identify TUSAs and collect a set of seed and training documents for each TUSA. The builder then uses those documents and a random set that is not topic or subject area specific, trains a statistical classifier (e.g. Naïve Bayesian) such as those implemented in open source Weka (http://www.cs.waikato.ac.nz/ml/weka/) or LingPipe (http://www.alias-i.com/lingpipe/) or TextCat (http://textcat.sourceforge.net/) to classify incoming documents in or out of each TUSA. The content of these is incorporated by reference in its entirety. The builder then collects a document collection specific to each TUSA using a focused web spider such as open source Heretrix (http://crawler.archive.org/) (or Nutch lucene.apache.org/nutch/) adapted to use the aforementioned classifier so as to gather from links only when they are within the TUSA.

Each document collected by the process, such as a focused crawler, can be examined by a human editor to remove any that do not fall within the desired TUSA if desired, but the accuracy of focused crawlers is documented to be high. Then documents may be selected so as to yield a roughly equal number of documents for each TUSA, ensuring that the average length of document in each TUSA is roughly equal to that of each other TUSA. These documents may then be prepared and indexed in a standard way into a standard information retrieval system such as open source Lucene (http://lucene.apache.org/), as documented by the selected information retrieval system. For each document to be indexed the name of the TUSA from which it is drawn is associated so that when a document is retrieved in the future it will be known which TUSAs it originated from.

Once indexed, the facilities of the information retrieval system are used to discriminate and rank TUSAs given a user input query as follows. The user input query is submitted to the information retrieval system as a query to retrieve the indexed documents. The information retrieval system has as a function the ability to return the list of documents it deems best associated with the terms of the input query, and this function is used for the present invention. It yields a list of documents for which the TUSAs have been coded at the time of indexing. To create a ranked list of TUSAs for the input query the M returned documents are tallied according to the TUSAs that were associated with each of them at the time of indexing. From this, a histogram of document counts by TUSA is derived, and the ranked list of TUSAs is created by ranking each TUSA by the number of documents retrieved for it. The highest ranked TUSA is the one corresponding to the greatest number of documents retrieved, and so forth in descending order. If no documents or a number lower than some threshold is returned the user can be notified that services are not available for this particular query.

Next the system automatically displays the highest ranked TUSA, sets it as active, and allows selection from a list of top ranked alternatives 8. A user may pick an alternate TUSA 9 and the system displays user-selectable optional terms for addition to the query in list form 10. One or more words or phrases statistically expected to co-occur with the Query terms in the context of the current TUSA are then displayed. The words or phrases presented are selected using Vocabulary Usage Models Derived for Each TUSA 15. For terms observed in each TUSA, Co-occurring Terms are ranked according to the expectation or likelihood that the co-occurrence terms are more probable co-occurrences for the TUSA and input query than for other terms or other TUSAs. This may be effected in a number of ways known to one practiced in the art.

In the following where the description addresses the handling of particular terms it is to be understood that phrases may be handled in similar fashion, appropriately adjusted by means familiar those practiced in the art. Further, on occasion, where context does not clearly dictate otherwise the word 'term' and the word 'word' may be used interchangeably. Further, the terms 'n-gram' and 'co-occurrence' are generally interchangeable where the contrary is not dictated by context. When referring to N-grams the methods to be discussed make use of what are known as "word" N-grams in this preferred embodiment rather than "character" N-grams to those practiced in the art. Character n-grams may be used in some embodiments. In general the low level procedures and steps described are well known to those practiced in the art and are well described in the references given or general literature in computational linguistics and machine learning.

In an exemplary case the builder of the system has created vocabulary models using standard word N-gram techniques known to those familiar with the art summarized as follows. For each TUSA, the creator of the system collects a corpus of documents or messages known to fall within the TUSA as previously described. The corpus is tokenized with standard procedures to remove unwanted punctuation and undesirable characters, the list of unique words occurring in the corpus is constructed and a list of less significant stop words are removed either prior to or as part of the step about to be described. Then each document in the corpus is scanned and word N-grams in a window of some length, e.g. in this case L equals 5, are recorded and compiled into tables with frequency of occurrence.

Optionally the record may be restricted to contiguous n-grams or may include non-contiguous ones as here in a preferred embodiment. Any length of n-gram may be collected within the limitations of available memory and hardware. In the primary case covered here n-gram length equals 2 so that bi-grams (bi-grams are n-grams of length 2) are collected for basic co-occurrence data. (Parameters may be set to collect only contiguous, one-directional n-grams of length equals 3, to collect three term phrases.) Parameters are set in the n-gram scanner to remove stop words if not already accomplished and to select the window size. In general a parameter will also be set to collect bi-grams that are bi-directional, that are combining cases of word1 followed by word2 with word2 followed by word1. This yields a list of co-occurring words for each source word.

It is routine to collect N-grams that are bi-directional, i.e. ones based on counts regardless of the order of co-occurring elements. It is likewise possible using standard techniques known to those practiced in the art to calculate which N-grams occur more often than would be expected by random chance, e.g. in various alternative embodiments using a t-score, metric of mutual information, likelihood ratio, or similarly effective statistic to determine which are statistically more significant. A t-score as implemented in the NSP package (Pedersen, Ted; The Design, Implementation, and Use of the Ngram Statistics Package; www.d.umn.edu/~tpederse/nsp.html) is used in the present embodiment. These techniques may typically yield a score indicating the expectation or likelihood the N-gram frequency in the TUSA data set is greater than it would be as a result of chance. This is the statistical score that is here used in the first instance to separate significant n-grams from insignificant ones. Note that we also store the frequency counts of each n-gram and the total number of n-grams in the corpus and we calculate a frequency ratio for each n-gram (frequency ratio equals count of n-grams/total n-grams.

In the current exemplary embodiment the NSP package would typically be used to extract N-grams of length 2 (bi-grams) but setting the following parameters: stop—pass in a list of stop words; "token" equals tokenize the input; "window" equals extract non-contiguous n-grams by examination of a sliding window of length 8; "frequency" equals ignore n-grams unless they occur at threshold frequency, 2 or 3 is typical here; and "tscore" equals use statistical t-score as a measure of significance.

Similarly, it is possible to construct a list of scored N-grams for more general vocabulary usage, in addition to those for each TUSA, that are derived from a collection of documents that covers randomly, in principle, many or all subject areas. The general vocabulary lists may be derived from a separate corpus constructed randomly without regard for TUSA, or samples of documents from a large number of TUSAs may be assembled together to form the general usage corpus. Those practiced in the art will know how to construct such a corpus for general vocabulary. Once the corpus for general vocabulary has been assembled it is analyzed in a fashion similar to that for each TUSA to extract a set of scored N-grams (bi-grams in the simple case here) with a statistical score and frequency ratio for each.

Each of the lists of N-grams, one for each TUSA and one for general vocabulary, is ranked by the associated statistical score. Once ranked, lists are reduced to a size desired to facilitate further processing by dropping items whose score falls below a specified threshold (such as 0.05 statistical significance as in the present embodiment), or by taking the top N items where N is the size of the desired set.

Further, each list of N-grams is converted to a look-up table such that, for any term that occurs as a term in an N-gram, the table specifies the list of terms (together with their statistical scores and frequency ratios) that co-occur with it in the N-grams. In this embodiment a hash table is built by scanning the N-gram list inserting unique items (individual terms) as hash keys and adding each of the terms observed to co-occur with it, as well as the statistical score and frequency ratio of its source N-gram, in a data structure stored as the hash entry. When this process is completed there results for general vocabulary, and for each TUSA, a look-up table such that, for each term looked up, there results a list of terms which have been observed to co-occur with it, together, for each of these co-occurring terms, with the statistical score and the frequency ratio.

Then, subsequently, with scored lists of N-gram co-occurrences for each TUSA and a scored list of N-gram co-occurrences for general vocabulary, it is useful in the manner presently to be described to prepare a new look-up table, referred to as a vocabulary model in FIG. 2, as follows, one for each TUSA.

For each key term in the lookup table, for the TUSA being processed, the co-occurring terms are retrieved with their corresponding statistical scores. Similarly, for each of these key terms the general vocabulary lookup-table is used to retrieve for that term the co-occurring terms in general vocabulary, together with their corresponding scores and frequency ratios.

The frequency ratio for each of these co-occurrences in the particular TUSA is divided by the frequency ratio for the corresponding co-occurrence from the look-up table for general vocabulary to yield a relevancy score which is the relative ratio reflecting relevance of the n-gram (bi-gram) to the particular TUSA. An alternative relative ratio has also been implemented for this embodiment wherein the statistical score (t-score in the present case) for the co-occurrence in the current particular TUSA is divided by the analogous statistical score for the same co-occurrence for general vocabulary to yield a relative significance score. For the purposes of this embodiment both the relative frequency ratio and relative score ratio may be used.

In case a co-occurrence occurs for the TUSA but does not occur for the general collection a default value is used for the latter in a standard practice to work around sparse data and division by zero. The co-occurrences, when put in sequential order from high to low according to their relevancy scores known as relative ratios, reflect the relevance of the co-occurrences for the currently active TUSA. Depending on the desired limitation for user interfaces some number Q, of top ranking co-occurrences for each key term is then saved in a new look-up table to be used at system run time, referred to as vocabulary model in FIG. 2. Thus, in one embodiment, for each key term in the TUSA a hash table is created with the term as the key and the list of co-occurrences, now with the relevancy scores, calculated as just described stored for each.

For each term in the original query in the context of a known TUSA, the vocabulary models for the TUSA yield a set of co-occurring terms expressed as co-occurrences for that term in a lookup table. It is possible in the manner presently to be described to calculate or tabulate one or more lists of useful new terms to present to the user based on the user's original query terms.

At system run time, given a user query and an assigned TUSA, the vocabulary model is loaded and used to select and present for the user additional terms for consideration in extending and editing the user's original query. For each query term the list of co-occurring words, with relevancy scores, in a given TUSA is retrieved. In one embodiment these lists are combined to make a single list, duplicates are removed favoring the higher relevancy score, and the derived list is re-ranked by relevancy scores. Then the desired top number of items is presented to the user.

Next a user selects terms from the lists of words or phrases representing an interest in further specifying the query 11. The system automatically adds selected user terms to the original prior query and submits the query to the information retrieval engine 12. In the current embodiment a small number of terms naming and representing the currently selected TUSA are also proposed to be added as an optional, user selectable feature. Next, a user views results and may revise the query or selected terms 13.

In one embodiment, the TUSA discrimination models 14 and vocabulary usage models 15 are derived 16 from TUSA document database 17; for each TUSA a large sample of representative messages has been collected using component to process the TUSA documents to discrimination models and vocabulary usage models.

For the present embodiment the foregoing refers to a facility for identifying and displaying single terms or phrases that have a co-occurrence relationship with one or more terms in the user query. Alternative embodiments of the present invention also foresee and anticipate multi-word combinations of other kinds. These include, but are not limited to: noun phrases extracted using a noun phrase chunker or parser, semantic entities extracted using an n-best entity extractor, syntactic and semantic phrases of various kinds extracted in various ways, contiguous capitalized phrases, and non-contiguous phrases. All these have in common a high correlation in a TUSA with terms or combinations of terms in the input user query.

Figure 3:
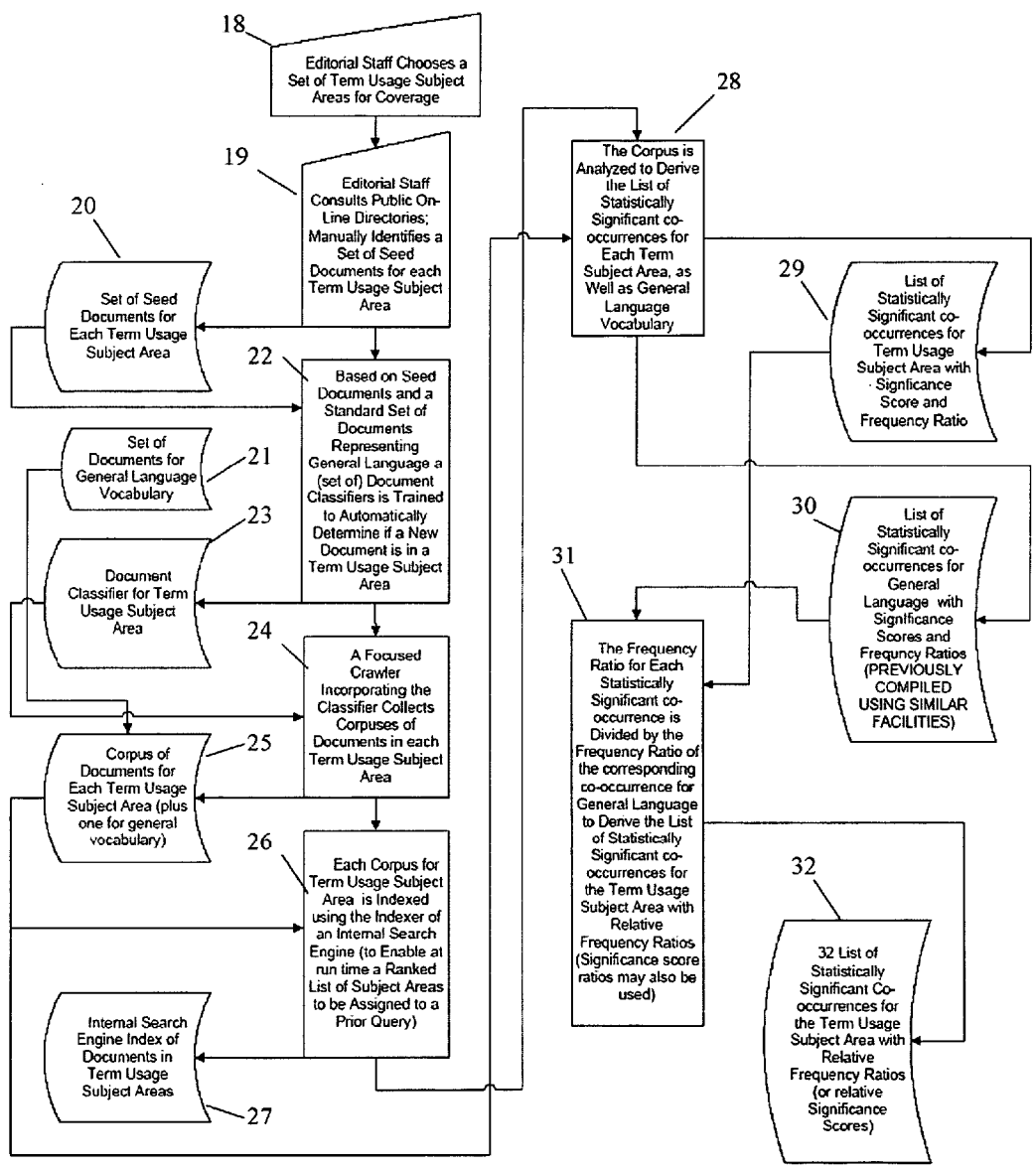
FIG. 3 is a flow chart that illustrates the data processing flow during preparation and analysis at system build time.

Now referring to FIG. 3, the data processing at system build time is illustrated. First, the editorial staff chooses a set of TUSAs for coverage 18. Next, the editorial staff consults public on-line directories 19; manually identifies a set of seed documents 20 for each TUSA and a set of documents for general language vocabulary 21. Based on the Seed Documents and a standard set of documents representing general language, a set of document classifiers 23 is trained to automatically determine if a new document is in the TUSA 22. A focused crawler incorporating the document classifier 23 collects a corpus of documents in each TUSA 24. A corpus of documents for each TUSA plus one for general vocabulary 25 are then created. Each corpus for each TUSA is indexed using the indexer of an internal search engine as to enable, at run time, a ranked list of subject areas to be assigned to a prior query 26. Next, the internal search engine index of documents in TUSAs is created 27. The corpus is then analyzed to derive the list of statistically significant co-occurrences for each TUSA, as well as general language vocabulary 28. A list of statistically significant co-occurrences for each TUSA with frequency ratios and significance scores 29 is created along with a list of statistically significant co-occurrences for general language with significance scores and frequency ratios previously compiled using similar facilities 30. The frequency ration for each statistically significant co-occurrence is divided by the frequency ratio of the corresponding co-occurrences for the TUSA with relative frequency ratios and significance co-occurrences for the TUSA with relative frequency ratios and significance scores may also be used 31. Finally, a list of statistically significant co-occurrences for the TUSA with relative frequency ratios or relative significance scores 32 is generated.

Figure 4:
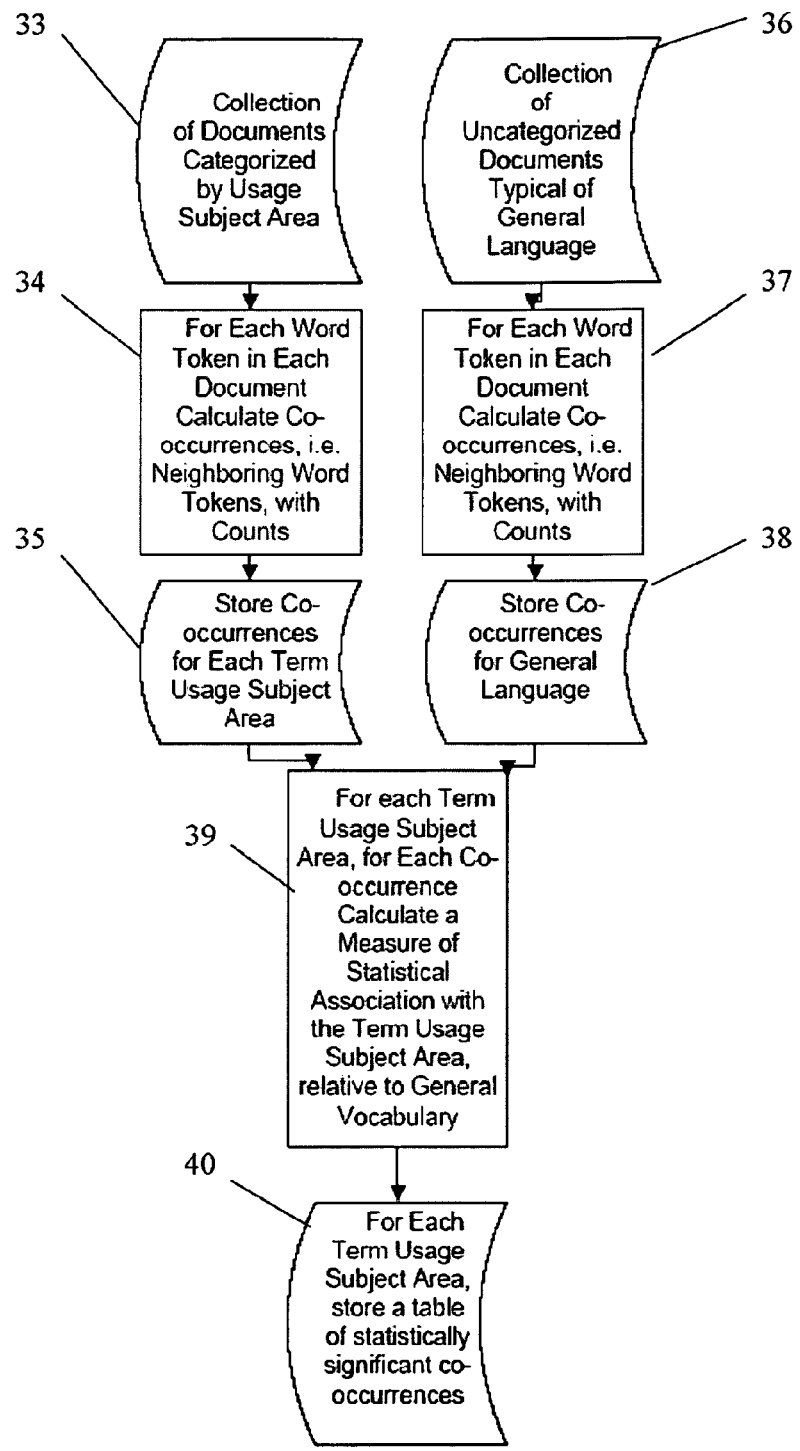
FIG. 4 is a flow chart showing the generation of co-occurrence data from document collections during preparation and analysis at system build time.

Now referring to FIG. 4, the generation of co-occurrence data from document collections is illustrated. In a first step, a collection of documents categorized by TUSA 33 are created. For each word token in each document the system calculates co-occurrences 34, such as, for example, neighboring word tokens, with counts. Co-occurrences for each TUSA are then stored 35, and collections of uncategorized documents typical of general language are created. For each word token in each document, co-occurrences are calculated 37, such as, for example, neighboring word tokens, with counts. Next, co-occurrences for general language are stored 38. For each TUSA and for each co-occurrence, a measure of statistical association with the TUSA is calculated relative to general vocabulary 39. Finally, for each TUSA, a table of statistically significant co-occurrences is stored 40.

Figure 5:
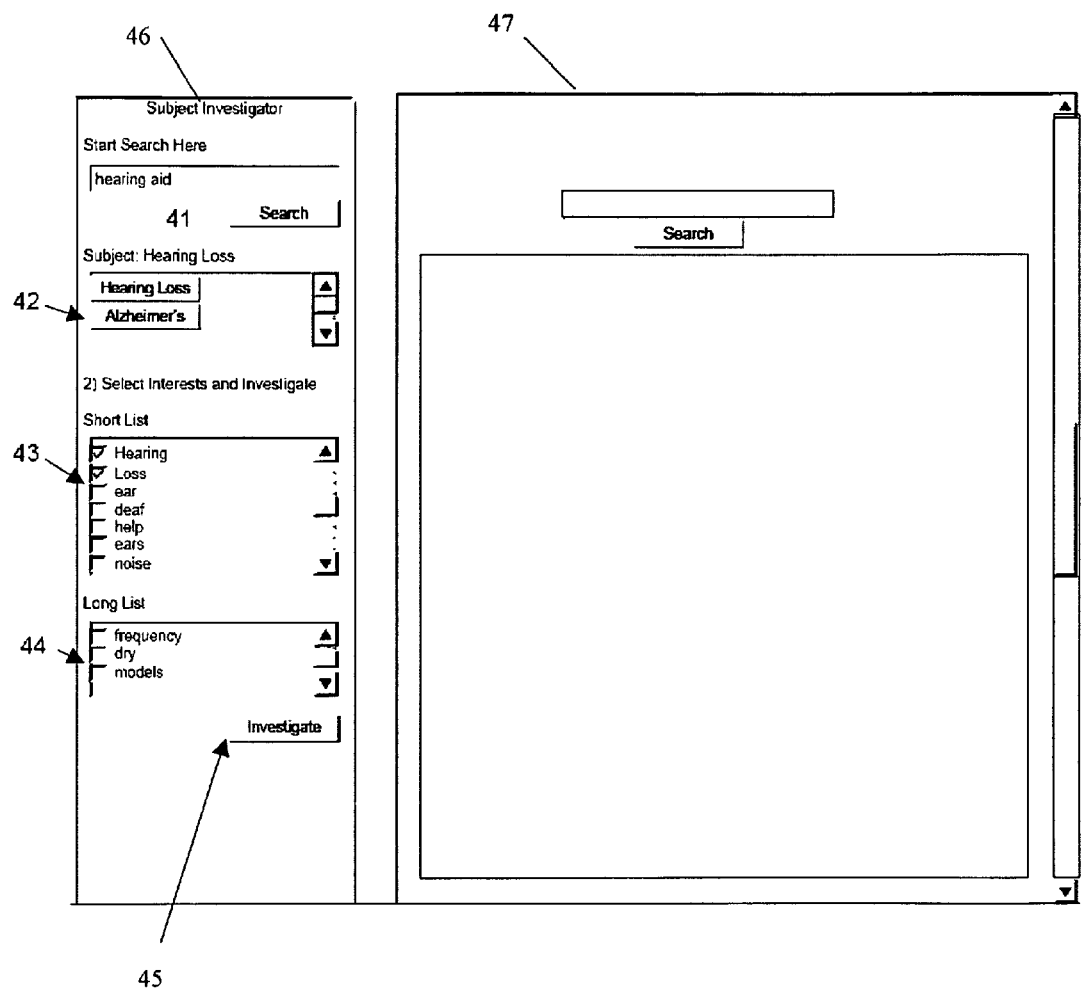
FIG. 5 is a user interface snapshot illustrating one embodiment for query refinement using the present invention.

FIG. 5 shows a graphical user interface illustrating one embodiment of the query refinement process of this invention. In this illustration the query refinement user interface is a browser extension 46, which acts as a companion to a standard search engine 47, in this case Google.

The user enters search text as query terms in a first text box and clicks on Search 41. These query terms are submitted to the search engine as if they had been directly entered in the search engine query box. The search engine return information is displayed in the right panel 47 in the illustration.

At the same time the system receives the query terms as input and uses them to determine a ranked list of TUSAs. The ranked list of matching TUSAs is displayed in the subject field 42 and the top TUSA (e.g. "Hearing Loss") is automatically selected as active. The user can at any time select one of the lower ranked TUSAs if preferred ("Alzheimer's"). At the same time that the selected TUSA is displayed the system also calculates a short list 43 and long list 44 of terms (with cutoff relevancy scores S and L, S<L) and displays them in the bottom two choice boxes. Alternate embodiments may show other lists, such as phrases. The user views these terms and selects ones that correspond to his/her interests. The user then clicks on Investigate 45 and the system adds the user interest terms to the original query terms 41, plus, if the system is so configured, a set of terms corresponding to the TUSA and resubmits the query. The new refined query is now submitted to the search engine and the information results appear in the right panel.

Figure 6:
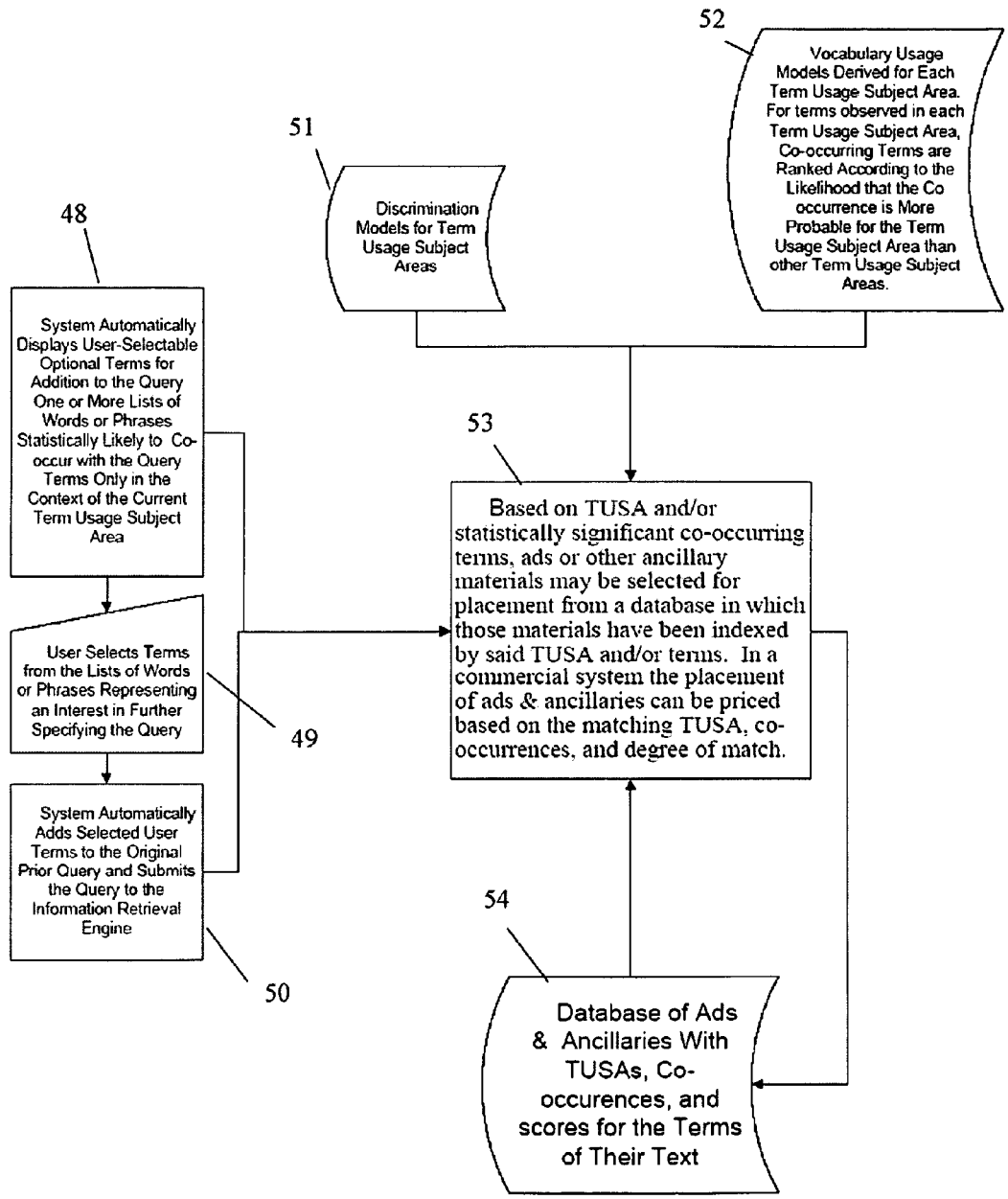
FIG. 6 shows a process for Selection and Pricing of Advertising and Ancillary Materials.

FIG. 6 shows a process for Selection and Pricing of Advertising and Ancillary Materials. This Figure may be understood in the context of other figures. FIG. 6 shows the integration of Ad and Ancillary Functions which effect the selection and pricing of advertisements or other ancillaries, based on the TUSA and/or co-occurrence items that are generated by the system.

Recapitulating the flow from FIG. 1, when the user enters query terms the system generates a TUSA and co-occurring terms or phrases ranked by score. When the ranked TUSA list and ranked co-occurrence lists are selected for the query 48, they are passed to the advertising and ancillary selection system 53 so that focused, targeted materials will be selected for presentation to the user. For each category passed, a TUSA is explicitly representative of a set of messages of a community of users. Also, the category is accompanied by a set of co-occurrence terms which are not represented in the list of query terms. This advertising model will be more context relevant than any prior advertising models.

At system build time, the ad and ancillary subsystem 53 has been provided access to the discrimination models 51 as well as the vocabulary models 52 and associated functions, and it processes the text of each of the ads or ancillaries in its database to select and record, in the database 54, the TUSAs and co-occurrence records, together with scores as already described.

The scores, frequencies, and ratios used in the main system are similarly recorded for advertisements and ancillaries. Some arbitrary limitation to N items above threshold score can be effected to the extent that size and speed issues arise on available hardware. As a build-time compilation step, an inverted index is created such that, for any TUSA or term provided as input, the system will return the inventory of ads or ancillaries that match for that term.

Then, at run time, when the advertising and ancillary selection system 53 is passed ranked TUSAs the inventory of ads or ancillaries that match the top rated TUSA can be retrieved. Within this set, the ranked co-occurrences of the query are compared by a best-fit match with the ranked co-occurrences of the advertisements and ancillaries. There are a variety of ways known to those practice in the art to do this match in a range of embodiments each of which produces a metric indicating the degree of match (referred to as the "match score"). The matching advertisements and ancillaries are displayed for the user.

The TUSA and co-occurrences together with the match score may be available to the end of constraining an advertising auction pricing system not to sacrifice ad content relevancy to the highest bidder. Advertisements may be constrained never to appear in case the TUSA of the advertisement does not match the TUSA of the query, and, the match score between the query co-occurrences terms and the advertisement co-occurrence terms may be set to a predefined prescribed minimum.

To the extent the pricing system is not exclusively auction based, it can be advantageous to base pricing directly on relevance, in which case the match score can serve as the basic value indicator.

In addition, a process is disclosed whereby the components of the present invention may be used to select on which web pages with advertisements listed by an advertisement agency should be placed. Using the discrimination models and vocabulary models and associated functions of this invention, an advertising agency can use a crawler to fetch and analyze, using facilities described herein, the text of pages of a content provider wishing to receive advertisements. This results in a ranked list of TUSAs, and a ranked list of co-occurrences, for each page crawled. These may be stored in a database and can be matched in the manner discussed previously with listed advertisements. The process is analogous except that where in the former queries are compared to advertisement text, in this case advertisement text is compared to content web page text.

Further, dependent on aspects of the foregoing, general, survey, tutorial, and summary material related to a query may be searched and presented automatically for the user. This is valuable for introductory, tutorial, or exploratory investigation. When a user enters query terms and the described system identifies co-occurring terms for addition to the query, the system can be configured to automatically, or by suggestion for manual action by the user, add many or all of the possible co-occurrence terms to the query. By virtue of this step of adding numerous co-occurrence terms to the query, when the new, thusly expanded query is submitted to the information retrieval system, it will tend to return desired general, survey, tutorial, and summary material (related to the query) in documents or other material returned.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A method for enhancing information search queries for information retrieval by computer, comprising the steps of:

establishing a plurality of term usage subject areas (TUSAs) wherein each TUSA comprises a predetermined subject area;

identifying a corpus of documents, messages, expositions, or communications exemplifying patterns of term usage specific to each TUSA wherein the corpus for each TUSA includes documents, messages, expositions, or communications disparate from information search queries;

analyzing documents, messages, expositions, or communications within each corpus of each TUSA to extract term co-occurrence and usage patterns;

receiving an information search query wherein the information search query includes one or more search terms;

identifying and assigning a primary TUSA corresponding to the information search query;

locating alternative or additional query terms or query phrases within the primary TUSA based on the term co-occurrence and usage patterns extracted through the analysis of the documents, messages, expositions, or communications within the corpus of the primary TUSA;

presenting the located alternative or additional query terms or phrases within the primary TUSA for use in refining the information search query;

permitting the selection and de-selection of alternative or additional query terms or phrases from among the located alternative or additional query terms or phrases presented by an executive action that does not necessarily require typing individual characters;

providing a mechanism to combine alternative or additional query terms or phrases selected from among the located alternative or additional query terms or phrases presented with the information search query received to create a new, enhanced information search query;

providing a mechanism to submit the new, enhanced information search query to a search engine to generate information search query results.

2. A method for enhancing information search queries for information retrieval by computer in claim 1, further comprising the steps of:
automatically identifying alternate TUSAs corresponding to the information search query and ranking the primary TUSA and the alternate TUSAs by expected relevance to the information search query.

3. A method for enhancing information search queries for information retrieval by computer in claim 1, further comprising the steps of:
automatically identifying alternative TUSAs corresponding to the information search query, ranking the primary TUSA and the alternative TUSAs by degree of match, and providing an option to switch among TUSAs.

4. A method for enhancing information search queries for information retrieval by computer in claim 3, further comprising the step of:
requiring the passive or active acceptance or specification of a TUSA of the information search query from among the primary TUSA and the alternative TUSAs.

5. A method for enhancing information search queries for information retrieval by computer in claim 1, further comprising the step of:
ranking the located alternative or additional query terms or phrases by relevance to the information search query and the primary TUSA based on the term co-occurrence and usage patterns extracted through the analysis of the documents, messages, expositions, or communications within the corpus of the primary TUSA.

6. A method for enhancing information search queries for information retrieval by computer in claim 1, further comprising the step of:
enabling access to more focused and higher quality results with less effort by mandating a selection of a TUSA or alternative or additional query terms or phrases from among the located alternative or additional query terms or phrases presented based on a selected TUSA.

7. A method for enhancing information search queries for information retrieval by computer in claim 1, further comprising the step of:
providing grammatical forms of an information search query term represented in a standard form that can be selected in one step.

8. A method for enhancing information search queries for information retrieval by computer in claim 1 wherein the step of establishing a plurality of TUSAs further comprises establishing a TUSA description term or terms for each TUSA and wherein the TUSA description term or terms for the primary TUSA is included with the located alternative or additional query terms or phrases within the primary TUSA presented.

9. A method for enhancing information search queries for information retrieval by computer in claim 1, further comprising the step of:
presenting the located alternative or additional query terms or phrases in various user interface formats.

10. A system for enhancing information search queries for information retrieval by computer, comprising
a browser program;
information pages served to the browser program;
a plurality of established term usage subject areas (TUSAs) wherein each TUSA comprises a predetermined subject area;
an identified corpus of documents, messages, expositions, or communications exemplifying patterns of term usage specific to each TUSA wherein the corpus for each TUSA includes documents, messages, expositions, or communications disparate from information search queries;
means for analyzing documents, messages, expositions, or communications within each corpus of each TUSA to extract term co-occurrence and usage patterns and statistics;
means for receiving an information search query relative to the browser program wherein the information search query includes one or more search terms;
means for identifying and assigning a primary TUSA corresponding to the information search query;
means for locating alternative or additional query terms or query phrases within the primary TUSA based on the term co-occurrence and usage patterns extracted through the analysis of the documents, messages, expositions, or communications within the corpus of the primary TUSA;
means for presenting the located alternative or additional query terms or phrases within the primary TUSA to the user via an interface for use in refining the information search query;
means for permitting a selection and de-selection of alternative or additional query terms or phrases from among the located alternative or additional query terms or phrases presented by an executive action that does not necessarily require typing individual characters;
a mechanism to combine alternative or additional query terms or phrases selected from among the located alternative or additional query terms or phrases presented with the information search query received to create a new, enhanced information search query; and
a mechanism to submit the new, enhanced information search query to a search engine to generate information search query results.

11. A system for enhancing information search queries for information retrieval by computer in claim 10, further comprising
a mechanism for selection and pricing of advertising and ancillary materials based on degree of match with the primary TUSA or the located alternative or additional query terms or phrases within the primary TUSA presented.

12. A system for enhancing information search queries for information retrieval by computer in claim 10, further comprising
a mechanism for selection of web pages for display of advertisements and ancillaries based on term co-occurrences and derived statistics analyzed in the text of the web pages with the primary TUSA or the located alternative or additional query terms or phrases within the primary TUSA presented.

13. A system for enhancing information search queries for information retrieval by computer in claim 10, further comprising
a mechanism for finding general, survey, tutorial, and summary material automatically derived by an automatic addition to the query of located alternative or additional query terms or phrases within the primary TUSA.

14. A system for enhancing information search queries for information retrieval by computer in claim 10, further comprising
means for providing a graphical user interface activated by keyboard and mouse, a voice activated interface, a gesture-activated interface, or other form of input activation.

15. A system for enhancing information search queries for information retrieval by computer in claim 10, further comprising
means for automatically identifying alternate TUSAs corresponding to the information search query and ranking the primary TUSA and the alternate TUSAs by expected relevance to the information search query.

16. A system for enhancing information search queries for information retrieval by computer in claim 15, further comprising
means for requiring a passive or active acceptance or specification of a TUSA of the information search query from among the primary TUSA and the alternative TUSAs.

17. A system for enhancing information search queries for information retrieval by computer in claim 15, further comprising
means for ranking the located alternative or additional query terms or phrases by relevance to the information search query and a selected TUSA based on the term co-occurrence and usage patterns extracted through the analysis of the documents, messages, expositions, or communications within the corpus of the selected TUSA.

18. A system for enhancing information search queries for information retrieval by computer in claim 10, further comprising
means for automatically identifying alternative TUSAs corresponding to the information search query, ranking the primary TUSA and the alternative TUSAs by degree of match, and providing an option to switch among TUSAs.

19. A system for enhancing information search queries for information retrieval by computer in claim 10, further comprising
means for enabling access to more focused and higher quality results with less effort by mandating a selection of a TUSA or alternative or additional query terms or phrases from among the located alternative or additional query terms or phrases presented.

20. A system for enhancing information search queries for information retrieval by computer in claim 10, further comprising
means for providing grammatical forms of an information search query term represented in a standard form that can be selected in one step.

21. A system for enhancing information search queries for information retrieval by computer in claim 10, further comprising a TUSA description term or terms for each TUSA wherein the TUSA description term or terms for the primary TUSA is included with the located alternative or additional query terms or phrases within the primary TUSA presented.

22. A system for enhancing information search queries for information retrieval by computer in claim 10, further comprising
means for presenting the located alternative or additional query terms or phrases in various user interface formats.

23. A method for enhancing information search queries for information retrieval by computer, comprising the steps of:
establishing during system development of a plurality of term usage subject areas (TUSAs) wherein each TUSA comprises a predetermined subject area;
identifying a corpus of documents, messages, expositions, or communications exemplifying patterns of term usage specific to each TUSA wherein the corpus for each TUSA includes documents, messages, expositions, or communications disparate from information search queries;
analyzing documents, messages, expositions, or communications within each corpus of each TUSA to extract term co-occurrence and usage patterns;
receiving an information search query wherein the information search query includes one or more search terms;
prior preparation during system development of means, for each TUSA, to suggest, in lists of single terms or multiple term phrases, ranked by relevance to the information search query, alternative or additive terms corresponding to terms of the information search query based on the term co-occurrence and usage patterns extracted through the analysis of the documents, messages, expositions, or communications within the corpus of the TUSA;
establishing a primary TUSA from the information search query;
establishing alternative TUSAs for the information search query, ranking the primary TUSA and the alternative TUSAs by degree of match to the information search query, and providing an option to switch among the primary TUSA and the alternative TUSAs;
requiring that a TUSA for the information search query be passively accepted or actively selected from the primary TUSA and the alternative TUSAs to establish a selected TUSA;
locating and presenting statistically significant additional terms or query phrases based on the term co-occurrence and usage patterns extracted through the analysis of the documents, messages, expositions, or communications within the corpus of the selected TUSA, specific for the information search query and the selected TUSA, for the purpose of query refinement, wherein the additional terms or query phrases are ranked by specificity and relevance to the information search query and the selected TUSA;
permitting a selection and de-selection of alternative or additional query terms by a simplified executive action that does not require typing individual characters;
providing a mechanism to combine the alternative or additional query terms selected by the user with the information search query to create a new, enhanced information search query; and
providing means to submit the new, enhanced information search query to a search engine to generate and view information search query results.

24. A method for enhancing information search queries for information retrieval by computer in claim 23, further comprising the step of:
providing a means for selection and pricing of advertising and ancillary materials based on degree of match with the selected TUSA or the alternative or additional query terms or phrases within the selected TUSA presented.

25. A method for enhancing information search queries for information retrieval by computer in claim 23, further comprising the additional step of:
providing a means for selection of web pages for display of advertisements and ancillaries based on term co-occurrences and derived statistics analyzed in the text of the web pages.

26. A method for enhancing information search queries for information retrieval by computer in claim 23, further comprising the step of:
providing means for finding general, survey, tutorial, and summary material automatically derived by an automatic addition to the query of located alternative or additional query terms or phrases within the primary TUSA.

* * * * *